Patented May 3, 1949

2,468,755

UNITED STATES PATENT OFFICE 2,468,755

FATTY ACID AMINE SALT COMPOSITION

Charles W. Hoerr, Chicago, Ill., assignor to Armour and Company, Chicago, Ill., a corporation of Illinois No Drawing. Application May 14, 1947, Serial No. 748,119

12 Claims. (Cl. 252—61)

This invention relates to a fluid composition containing a fatty acid amine salt in a brine solution.

The high molecular weight fatty acid amine salts are useful as reagents for many purposes. Although these reagents are usually employed in water solutions, it would be very desirable in some cases to use them in connection with a brine solution. The use of such compounds in brine presents a problem because of their well-known insolubility in brine solutions. It is known that 10% octadecyl amine acetate, for example, forms a gel in saturated sodium chloride or potassium chloride solution. Therefore it has been customary in the past to introduce the amine salt reagent in large volumes of water, though the water is not needed in the process and is in some instances actually disadvantageous.

I have now discovered that it is possible to prepare a fluid brine-amine salt composition by holding the concentration of the brine and amine salt within certain intermediate ranges. When using amine salt concentration of from 3% to 15%, I find that the amine salt and brine of from 25% to 70% saturation is fluid and may easily be poured or mixed. This is quite an unexpected characteristic since this same concentration of amine salt forms a solid at brine saturations of either 20% or 100%. This result is still more surprising when it is considered that the amine salt such as octadecyl amine acetate used in a concentration of as low as 4% in water forms a kind of jelly at room temperature and fluidity is quite poor.

The amine salt involved in the present invention may be any salt of a fatty acid amine of 10 or more carbon atoms with either an inorganic acid or an organic acid of 6 or less carbon atoms. For example, the salt may be dodecyl amine hydrochloride, hexadecyl amine hydrochloride, octadecyl amine hydrochloride, oleyl amine hydrochloride, etc. Instead of the hydrochlorides I may use the acetate, the phosphate, the sulphate, sulphamate, propionate, butyrate, formate, etc. I may use amine salt mixtures obtained from fatty acids of the natural fats or oils such as tallow, soya bean oil, cottonseed oil, coconut oil. etc. Or, I may use amine salt mixtures prepared from fractions of these natural acid mixtures.

The brine employed in the present invention has the general formula $A_xB_y$, where A is any alkali earth metal or alkali metal, B is an acid ion, and $x$ and $y$ are small whole numbers. For example, the brine may be sodium chloride, potassium chloride, calcium chloride, or barium chloride. Instead of chloride I may use iodide, nitrate, acetate, chlorate, oxalate, citrate, etc.

I obtain the special fluidity characteristics when the amine salt is in concentration of from 3% to 15% by weight, preferably between 5% and 10%, and the brine is 25% to 70% saturated, preferably 40% to 50%, or about 50% saturated. The amine concentrations mentioned in this specification and claims are based on the weight of the amine designated as compared with the weight of the whole composition.

Examples of specific concentration demonstrating the practice of my invention are given as follows:

Example I

5% octadecylammonium acetate in water forms a rigid, gelatinous mass at 25° C. In a 12% brine of mixed sodium and potassium chlorides 5% octadecylammonium acetate yields a non-viscous, readily mobile fluid at 25° C.

Example II

10% mixed octadecyl- and octadecenylammonium acetates in water forms a solid, insoluble mass at 25° C. In a 7% brine of sodium chloride 10% of this mixture of amine acetates yields a slightly viscous, readily mobile fluid at 25° C.

Example III

Dodecylammonium chloride is soluble to the extent of about 15% in water at 28° C. In a 10% solution of calcium acetate, the gelation temperature of 15% dodecylammonium chloride is lowered to about 12° C.

Example IV

Dodecylammonium sulfamate is soluble in water to the extent of considerably less than 0.1%. In a 5% solution of barium chloride, this amine salt is soluble to the extent of at least 10% at 25° C.

One very advantageous way to utilize my invention is in the addition of amine reagents to flotation circuits in the flotation separation of ores. For example, when potassium chloride is being separated from sodium chloride, the amine reagent may be prepared in a solution of either sodium chloride or potassium chloride, or mixtures thereof, and the prepared composition added in fluid form to the flotation circuit. This is very advantageous since it eliminates the necessity of water addition, which is a very undesirable feature.

The foregoing detailed description and examples have been given for purposes of explanation only and it is expected that my improvements may be practiced in widely different forms, all within the spirit of the invention.

I claim:

1. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a salt of a fatty acid amine containing at least 10 carbon atoms with an acid selected from the group consisting of inorganic acids and organic acids having not more than 6 carbon atoms, said brine solution being from 25% to 70% saturated and said amine salt being in a concentration of from 3% to 15%.

2. An aqueous fluid composition comprising a solution of a brine having the formula $A_xCl_y$, where A is an element selected from the group consisting of the alkali metals and alkali earth metals and $x$ and $y$ are small whole numbers, and a salt of a fatty acid amine containing at least 10 carbon atoms with an acid selected from the group consisting of inorganic acids and organic acids having not more than 6 carbon atoms, said brine solution being from 25% to 70% saturated and said amine salt being in a concentration of from 3% to 15%.

3. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a fatty acid amine hydrochloride containing at least 10 carbon atoms, said brine solution being from 25% to 70% saturated and said amine hydrochloride being in a concentration of from 3% to 15%.

4. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a fatty acid amine acetate containing at least 10 carbon atoms, said brine solution being from 25% to 70% saturated and said amine acetate being in a concentration of from 3% to 15%.

5. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a salt of a fatty acid amine containing at least 10 carbon atoms with an acid selected from the group consisting of inorganic acids and organic acids of not more than 6 carbon atoms, said brine solution being from 40% to 50% saturated, and said amine salt being in a concentration of from 5% to 10%.

6. An aqueous fluid composition comprising a solution of sodium chloride and a salt of a fatty acid amine containing at least 10 carbon atoms with an acid selected from the group consisting of inorganic and organic acids of not more than 6 carbon atoms, said sodium chloride being from 25% to 70% saturated and said amine salt being in a concentration of from 3% to 15%.

7. An aqueous fluid composition comprising a solution of potassium chloride and a salt of a fatty acid amine containing at least 10 carbon atoms with an acid selected from the group consisting of inorganic and organic acids of not more than 6 carbon atoms, said potassium chloride being from 25% to 70% saturated and said amine salt being in a concentration of from 3% to 15%.

8. An aqueous fluid composition comprising a solution of mixed sodium chloride and potassium chloride, and a salt of a fatty acid amine containing at least 10 carbon atoms, with an acid selected from the group consisting of inorganic acids and one of not more than 6 carbon atoms, said solution of mixed sodium chloride and potassium chloride being 25% to 70% saturated and said amine salt being in a concentration of from 3% to 15%.

9. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a salt of dodecyl amine with an acid selected from the group consisting of inorganic acids and organic acids of not more than 6 carbon atoms, said brine solution being from 25% to 70% saturated and said dodecyl amine salt being in concentration of from 3% to 15%.

10. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a salt of octadecyl amine with an acid selected from the group consisting of inorganic acids and organic acids of not more than 6 carbon atoms, said brine solution being from 25% to 70% saturated and said octadecyl amine salt being in concentration of from 3% to 15%.

11. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a salt of oleyl amine with an acid selected from the group consisting of inorganic acids and organic acids of not more than 6 carbon atoms, said brine solution being from 25% to 70% saturated and said oleyl amine salt being in concentration of from 3% to 15%.

12. An aqueous fluid composition comprising a solution of a brine having the formula $A_xB_y$, where A is an element selected from the group consisting of the alkali metals and alkali earth metals, B is an acid ion, and $x$ and $y$ are small whole numbers, and a salt of a fatty acid amine containing at least 10 carbon atoms with an acid selected from the group consisting of inorganic acids and organic acids having not more than 6 carbon atoms, said brine solution being about 50% saturated and said amine salt being in a concentration of about 10%.

CHARLES W. HOERR.

REFERENCES CITED

The following references are of record in the file of this patent:

UNITED STATES PATENTS

| Number | Name | Date |
|---|---|---|
| 2,088,325 | Kirby | July 27, 1937 |
| 2,329,149 | Weiner | Sept. 7, 1943 |
| 2,336,778 | Costa | Dec. 14, 1943 |
| 2,364,520 | Cole et al. | Dec. 5, 1944 |